United States Patent [19]

Stockhausen

[11] Patent Number: 4,930,468

[45] Date of Patent: Jun. 5, 1990

[54] ICE WITH SINGLE INTAKE VALVE AND DUAL INTAKE MANIFOLD RUNNERS

[75] Inventor: William F. Stockhausen, Northville, Mich.

[73] Assignee: Ford Motor Company, Dearborn, Mich.

[21] Appl. No.: 334,254

[22] Filed: Apr. 6, 1989

[51] Int. Cl.⁵ ............................................... F02B 31/00
[52] U.S. Cl. ................................. 123/188 M; 123/308
[58] Field of Search .................. 123/188 M, 308, 306, 123/432, 52 M

[56] References Cited

U.S. PATENT DOCUMENTS

| | | | |
|---|---|---|---|
| 3,318,292 | 5/1967 | Hideg | 123/308 |
| 4,485,775 | 12/1984 | Kanda et al. | 123/188 M |
| 4,499,868 | 2/1985 | Kanda et al. | 123/188 M |
| 4,550,699 | 11/1985 | Okumura et al. | 123/188 M |
| 4,844,040 | 7/1989 | Leighton et al. | 123/188 M |

Primary Examiner—Andrew M. Dolinar
Assistant Examiner—M. Macy

Attorney, Agent, or Firm—Robert E. McCollum; Clifford L. Sadler

[57] ABSTRACT

An ICE with at least one intake port and intake valve has an air inlet passage that is split by a divider wall into primary and secondary runners, the primary being smaller than the secondary. The secondary contains a flow deactivation valve for shutting off or permitting flow to the inlet port opening. The divider wall extends to a point immediately adjacent the intake valve stem so as to positively divide the passage into the two independent runners. The centerline of the primary passage is oriented so as to produce the desired swirl rate to the air flow, other geometric considerations being defined to accurately control the swirl rate of flow and velocity to provide maximum efficiency of operation; one being that the primary passage cross-sectional area be 40%-50% of the total cross-sectional area of the port opening, another being that the volume between the closed deactivation valve and the intake valve being less than 15% of the cylinder displaced volume, and including other sized ratios.

11 Claims, 4 Drawing Sheets

ICE WITH SINGLE INTAKE VALVE AND DUAL INTAKE MANIFOLD RUNNERS

This invention relates in general to intake manifolding for an automotive type internal combustion engine. More particularly, it relates to one in which an intake valve port opening is connected to an ambient air inlet by a passage that is split into primary and secondary runners by a wall for controlling flow volume as well as swirl intensity of an air/fuel charge flowing into the port opening. The secondary runner contains a flow deactivation valve for controlling the intensity of the swirl as well as the total air flow to the intake port opening, the cross-sectional area of the primary runner and the volume of the secondary runner being tightly controlled, as is the geometric configuration, to provide optimum gasoline engine performance at high speed, maximum power, as well as at low speed, light load conditions.

The use of dual manifolds to control air flow/fuel to a single intake valve port opening, with the secondary manifold being controlled by a valve, to control swirl and engine charge burn rates, is known. For example, U.S. Pat. No. 4,550,699, Okumura et al, shows an engine with two intake valves, 6a and 6b, each having dual manifold air inlets, with the secondary passages being controlled by a rotary control valve. At one point, the secondary passage appears as large as the primary passage; furthermore, the secondary passage has a large volume between the deactivation control valve and the intake port opening which leads to large engine pumping losses when the valve is closed. No indication is given of the size of the primary and secondary passages to provide the flow velocity and volume necessary for the desired swirl.

U.S. Pat. No. 4,543,931, Hitomi et al, shows an engine intake manifolding system including a horizontally positioned partition member 14 that divides the manifold into primary and secondary runners, the secondary runner having a deactivation flow valve 15. It will be noted that the partition does not extend to the valve stem and therefore effects a recombination of the air streams in both channels prior to the intake valve port opening, which suppresses the generation of swirl. Again, there is no indication of the relative sizes of the primary and secondary passages to assure sufficient swirl at low speed, light load conditions, or the specific geometric configurations also necessary to control the swirl desired.

U.S. Pat. No. 4,256,062, Schafer, shows primary and secondary intake manifold runners directing air to an engine intake manifold port opening, a common wall defining the two runners, and deactivation valve means to control flow through the runners. In this case, a large volume of the secondary runner when the deactivation valve is closed diminishes the effect of the swirl generated by the primary passage. Also, the small cross-sectional area of the secondary passage leads to increased engine pumping losses. Also, the geometric configurations are not indicated that lead to a design to provide the proper swirl at low speed, light load conditions.

U.S Pat. No. 4,499,868, Kanda et al, shows primary and secondary engine intake manifold runners connected to a single intake valve port opening and defined by a partition or wall 19 and a deactivation valve in the secondary passage. However, the dividing wall extends downwardly only a portion of the intake passage and does not define distinct primary and secondary passages that will control swirl rate in a desired manner.

From the above, it will be seen that there is no teaching in any of the references of the specific configuration and cross-sectional areas and volumes of the various passages to control swirl in a manner to maximize engine operating efficiency at both maximum and minimum operating conditions.

Therefore, it is a primary object of the invention to provide an engine manifolding construction that includes dual manifolding to a single engine intake valve opening, wherein the cross-sectional area of the primary passage or runner is between 40%–50% of the total cross-sectional area of the intake valve port opening for minimizing engine pumping losses when the deactivation valve is closed, and wherein the secondary passage volume between the deactivation valve and the intake port opening is less than 15% of the cylinder displaced volume so as not to diminish the intensity of the swirl generated by the primary passage; and wherein other critical dimensions are provided for effecting the desired amount of swirl to control engine burn rates.

Other objects, features and advantages of the invention will become more apparent upon reference to the succeeding, detailed description thereof, and to the drawings illustrating the preferred embodiment thereof; wherein.

Figure 4:
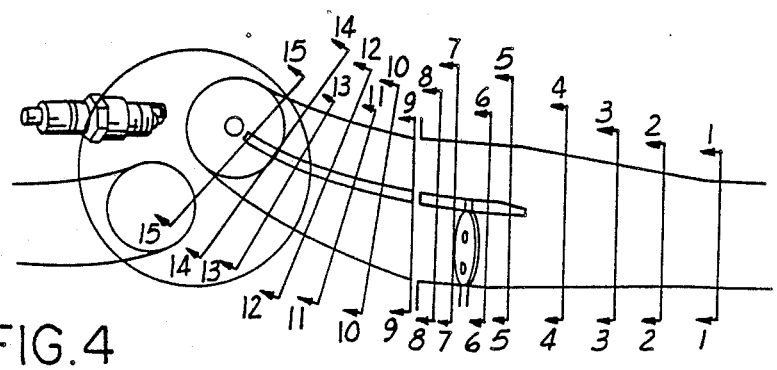
FIGS. 4 and 5 are views corresponding to FIGS. 1 and 2, respectively.
Figure 5:
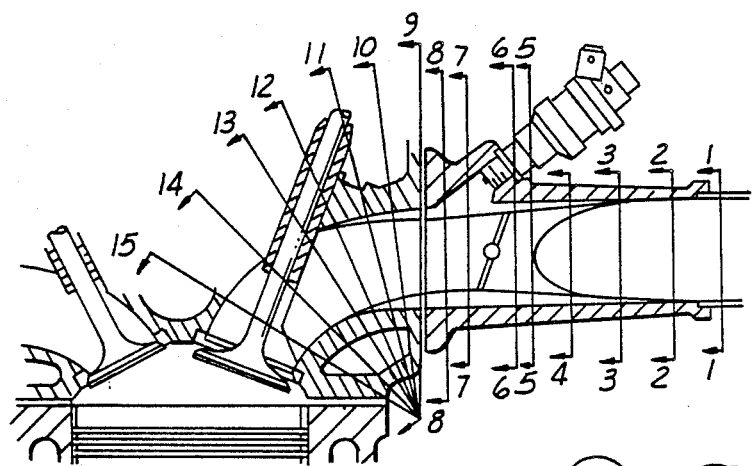
Figure 6:
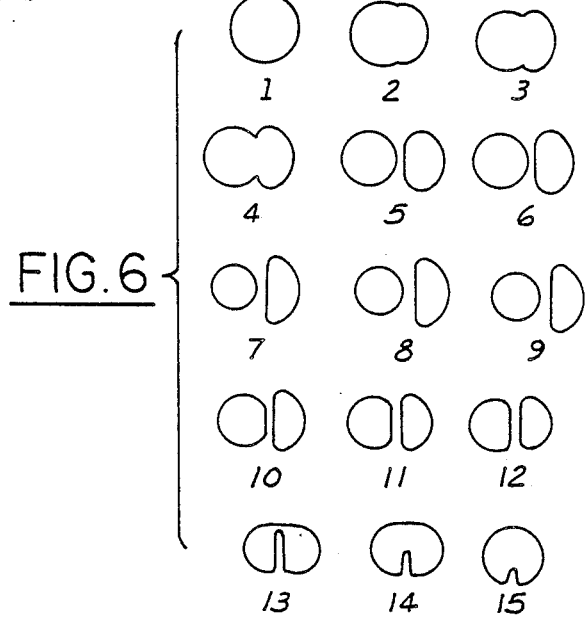
Figure 7:
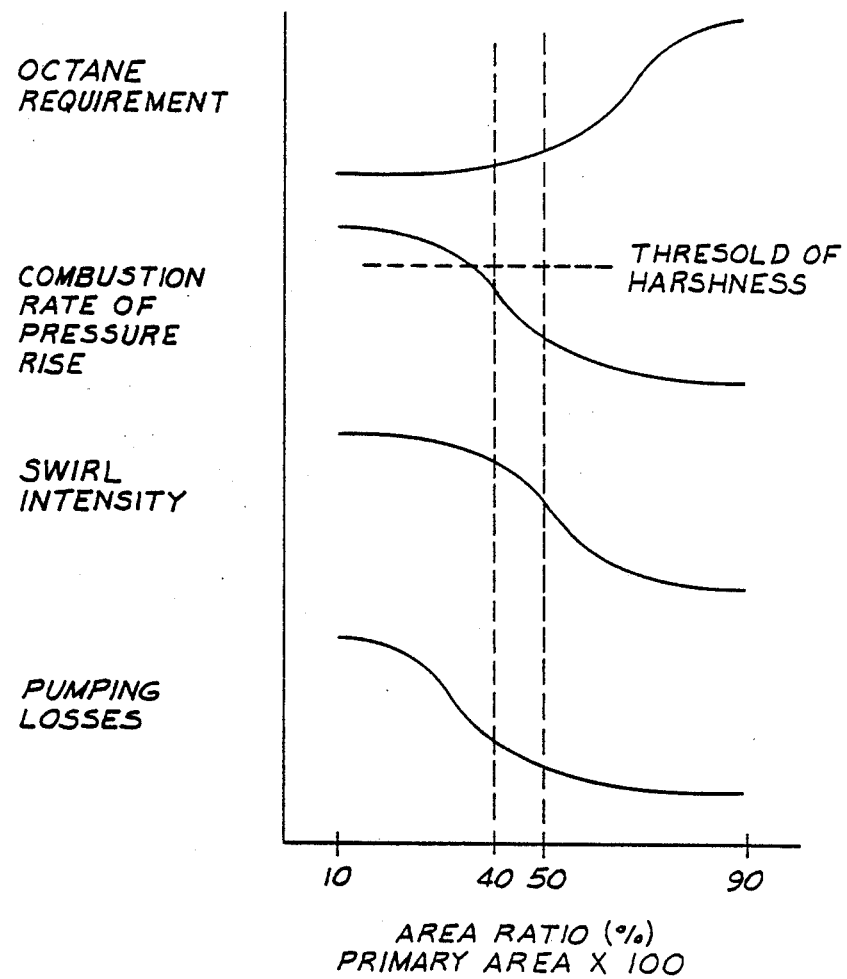
Figure 8:
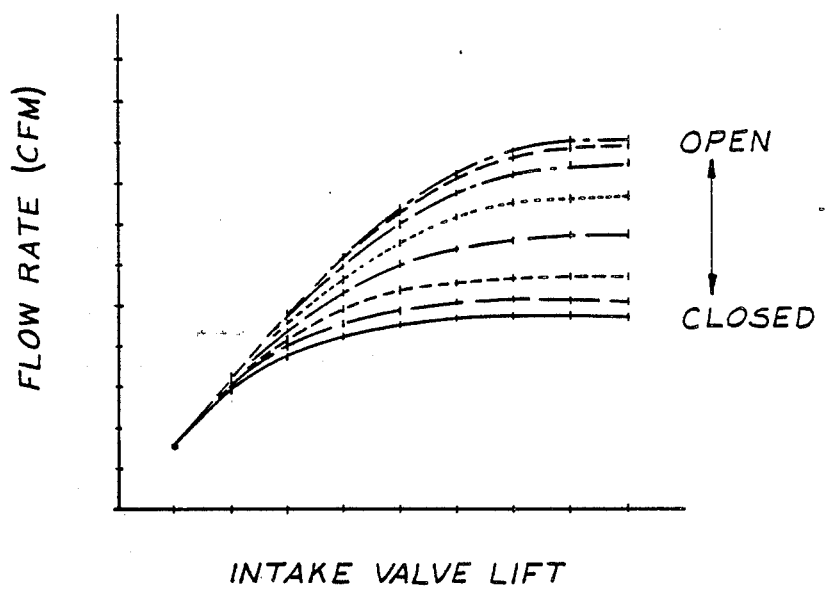
Figure 9:
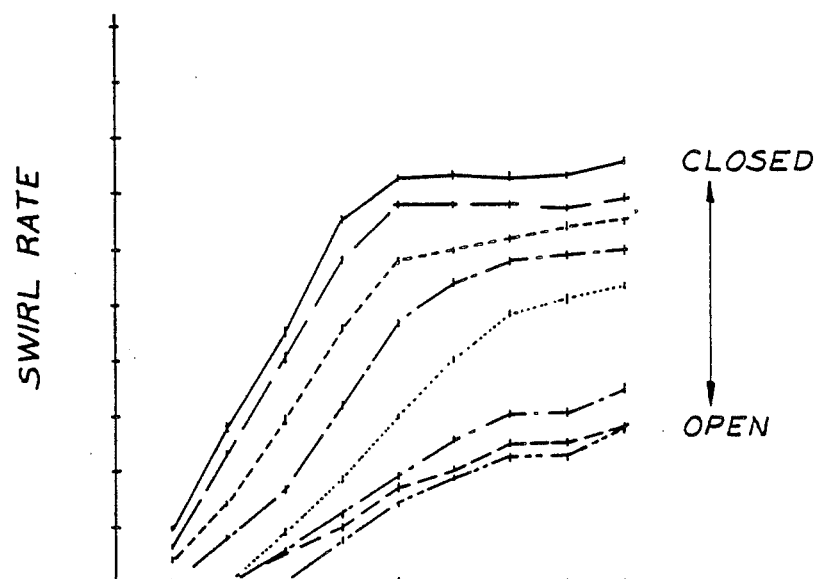

FIG. 6 includes multiple cross-sectional views indicated by corresponding numbers and taken on respective planes indicated by and viewed in the direction of the corresponding arrows in FIGS. 4 and 5;

FIG. 7 is a chart graphically comparing various engine operating characteristics with changes in area ratio; and FIGS. 8 and 9 are further graphical illustrations comparing intake valve lift with engine air/fuel swirl and flow rates.

Figure 1:
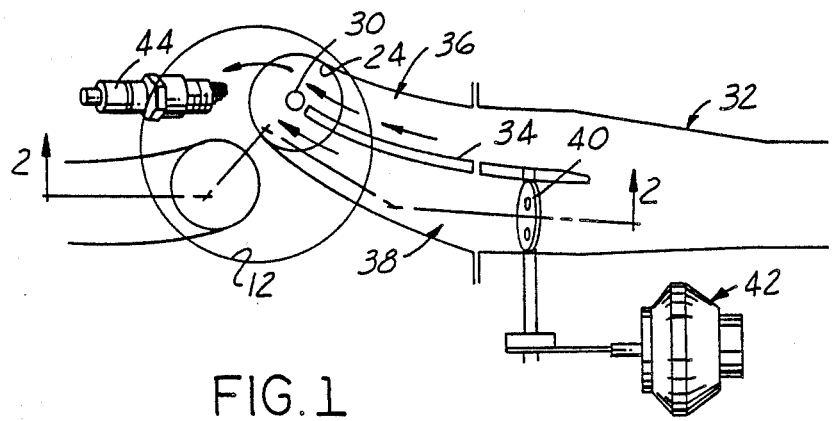
FIG. 1 is a cross-sectional view, schematically illustrated, of a portion of an engine embodying the invention.

FIG. 1 illustrates schematically a portion of an automotive type internal combustion engine. It includes a cylinder block 10 having a bore 12 within which is reciprocably mounted a piston 14. Attached to the block is a conventional cylinder head 16 having a recessed portion defining a combustion chamber 18 and the usual intake and exhaust valves 20 and 22. The latter are mounted for reciprocation between open and closed positions for controlling flow through the port openings 24 and 26, respectively. Each of the valves includes the usual head 28 and a stem 30.

As best seen in FIG. 1, the intake valve port opening is connected to ambient air by means of a passage 32 that contains a vertically extending partition or wall 34. The latter splits the passage 32 into two side-by-side manifold runners, a primary 36 and a secondary 38. Flow through the secondary in this case is controlled by a flow deactivation valve 40 rotatably mounted in the passage and controlled in a known manner by any suitable servo mechanism indicated in general at 42.

Figure 2:
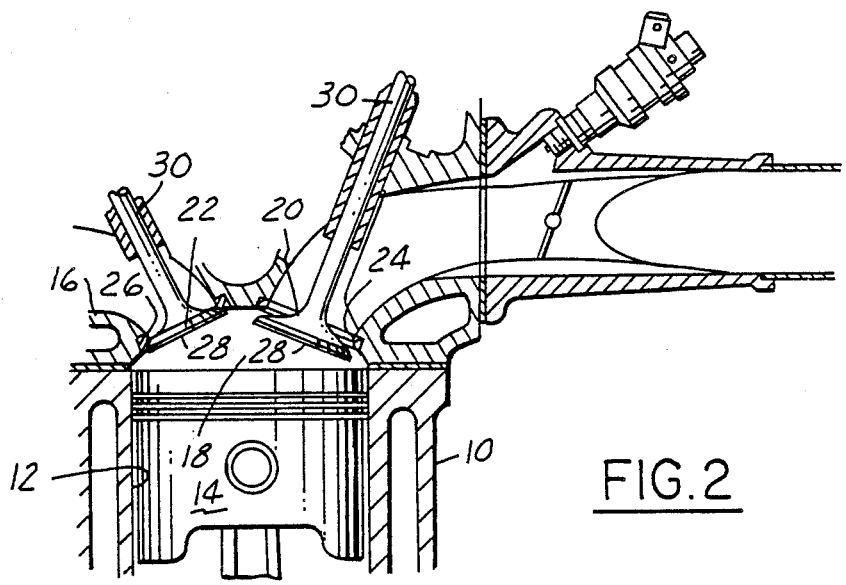
FIG. 2 is a cross-sectional view taken on a plane indicated by and viewed in the direction of the arrows 2—2 of FIG. 1.

As stated previously, the cross-sectional area of the primary passage 36, the longitudinal extent of the dividing wall 34, and the secondary passage volume between the valve 40 and the port opening 24, is important. These will control the swirl of the incoming air/fuel charge and the flow rate so that the engine will operate efficiently at both maximum and minimum power ranges. In this case, as seen in FIG. 2, fuel from the injector shown is injected into the primary runner 36 for ignition by a conventional spark plug 44. As will be described subsequently, the engine will achieve maximum high speed power because the intake port opening 24 in this case is of the minimum restriction, free-breathing type, due to the specific geometric configurations to be described that control swirl in a desired manner. The engine also achieves a maximum torque possible at low speed because in this case the inducted swirl suppresses detonation while the cross-sectional flow area maintains a minimum flow restriction. The engine also achieves good combustion stability and burn rates at low load and idle conditions because of the specific characteristics herein described.

In this case, it will be seen in FIG. 1 that the dividing wall 34 extends directly to a point immediately adjacent and in line with the valve stem 30 to positively divide the air inlet passage 32 into primary and secondary passages that are independent of one another. Furthermore, the alignment of the dividing wall parallel to the vertical axis of the valve stem 30 directs the incoming air in the primary passage into the intake port opening in a tangential manner to thereby induce a strong swirling motion of the mixture inside the cylinder. The dividing wall 34, in this case, also extends vertically the full depth or lateral extent of the air inlet passage.

The primary passage 36 also is located outboard or laterally furthest from the cylinder bore centerline compared to the secondary passage so that when air is flowing through it alone, extremely high levels of swirl can be developed in the cylinder.

In order to provide the optimum swirl intensity, it is important that the volume contained in the secondary passage runner 38, between the deactivation valve 40 and the intake valve port opening, be less than 15% of the cylinder displaced volume when the deactivation valve is closed. When the valve is closed, this volume is parasitic to the intake flow, and together with the flow in the primary passage, must be drawn down to the incylinder intake pressure before appreciable primary passage flow starts. A secondary passage volume greater than the 15% value would result in the drawdown flow from the secondary passage into the cylinder when the intake valve opens diminishing the effect of the swirl generated by the primary passage.

Figure 3:
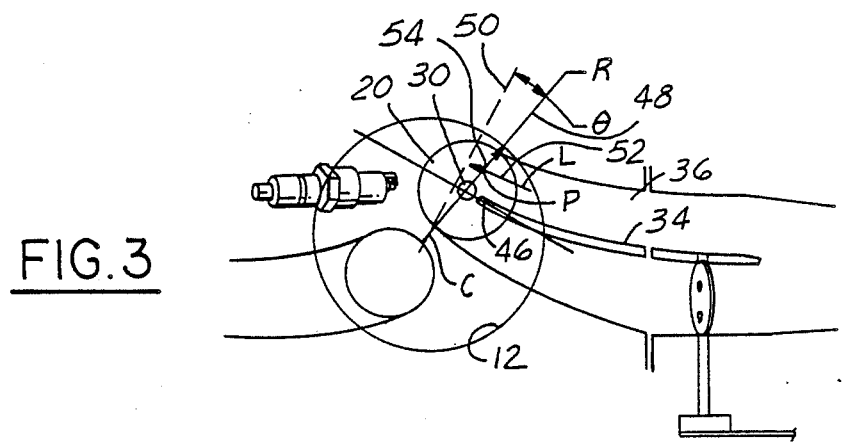
FIG. 3 is a view similar to FIG. 1.

Other considerations of importance are the geometric relationships of the end of the primary passage 36 with the intake valve centerline and the cylinder bore wall 12. As best be seen in FIG. 3, the orientation of the end 46 of the divider wall 34 that is immediately adjacent the valve stem 30 is such that the angle $\theta$ formed between the full line 48 extending from the cylinder bore center C through the intake valve stem 30 and a second dotted line 50 that is normal to the centerline of the dividing wall 34, as extended through the center of the intake valve stem 30, should be between 10°–20°.

Also, the centerline 52(L) of the intake valve end of the primary passage 36, as it is extended past the intake valve, should intersect the line 48 that extends out to the bore 12, the distance of this intersection point 54(P) from the bore center being between 0.75 and 0.85 of the bore radius R.

Another consideration is that the spark plug 44 should be located in the combustion chamber as shown such that the incoming swirling air charge will scavenge the electrodes of exhaust gas residuals and thus provide optimum initiation of the ensuing combustion.

A still further consideration is that the cross-sectional area of the primary passage 36 must be between 40%–50% of the total cross-sectional area of the intake port opening. Any area ratio less than this would be too restrictive for air flow and would not give sufficient engine operating range when only the primary passage is open, which is the case with many other concepts of this sort that necessitate constant open and closing of the deactivation valve with a consequent increase in engine calibration difficulties, in order to obtain the necessary flow.

FIGS. 4, 5 and 6 show the cross-sectional shapes or configurations of both the primary and secondary runners or passages 36 and 38 at the various cross-sectional planes indicated in FIGS. 4 and 5. They show the gradual change in the cross-sectional shapes, the primary passage remaining in a semi-circular shape from Section 1 all the way to the intake valve stem at section 13 where it rejoins the secondary passage. This constant cross-sectional shape minimizes the flow losses associated with the splitting of the main passage 32 into the primary and secondary runners and the rejoining again at their downstream ends. It will be seen that the secondary passage is blended from being approximately half-circular at the intake valve to round at the location of the deactivation valve, this being to facilitate the efficient manufacture and easy assembly of the deactivation valve in high production volume.

FIG. 7 graphically illustrates the relationship between the cross-sectional area ratio of the primary passage and the intake port opening and important engine operating parameters. As can be seen, this area ratio will minimize engine pumping work and therefore maximize fuel economy by being unrestrictive even with the secondary runner 38 closed. An area ratio greater than the 40%–50% stated above would not provide sufficient swirl to stabilize combustion and enhance burn rates. An advantage of maintaining the area ratio in this range is that it also keeps the rate of pressure rise of the combustion below the threshold of audible harshness. It additionally reduces the octane requirement of the engine at low speed, maximum load conditions due to the knock-suppression tendencies of swirling combustion.

In order to obtain the proper in-cylinder swirl intensity desired, another critical relationship is the ratio of the total intake valve port cross-sectional area, at a point one-half the diameter of the intake valve head upstream from the valve head, to the area of the outside diameter of the intake valve head. This ratio should be between 0.55 and 0.65.

The primary passage 36 will remain open all the time and would normally have the fuel injector located in it, as indicated in FIG. 2. The flow deactivation valve 40 would be closed at idle and thereafter could be closed, modulated or incrementally opened at part load conditions and low speed, high load conditions. It would be fully opened at high speeds and loads. Maximum to minimum rates of swirl would be obtained in a well-behaved fashion by modulating the opening of the deactivation valve.

FIGS. 8 and 9 illustrate the relationships between swirl rate or swirl intensity and air flow as a function of intake valve lift. The ability to modify the flow and swirl characteristics of the engine are independent of the overall air control or throttling. Throttling of the overall engine air supply takes place upstream of the deactivation valve.

EGR and PCV systems would be introduced into the primary passage 36 so as not to expose the deactivation valve 40 to possible deposit build-up. The deactivation valve could be oriented horizontally or vertically and be actuated by an inline shaft connecting mechanism or linkages that could be used to operate a series of valves simultaneously.

The operation of the invention is believed to be clear from the above description and a consideration of the drawings, and, therefore, is not repeated.

While the invention has been shown and described in its preferred embodiment, it will be clear to those skilled in the arts to which it pertains that many changes and modifications may be made thereto without departing from the scope of the invention.

I claim:

1. An induction system for a multi-cylinder internal combustion engine having at least one intake valve port opening per cylinder, a pair of individual primary and secondary intake manifold runners for each cylinder with each runner connected at one end to an air inlet and both runners connected at their other ends to the same cylinder intake valve port opening, the primary runner being connected to the opening in a manner to effect flow tangentially thereinto to induce a strong swirl motion to the air/fuel mixture inducted into the cylinder, an intake valve mounted for movement into and out of the opening for controlling flow through the same, the latter valve having a stem projecting upwardly therefrom, and deactivation valve means variably moveable in each secondary runner to block or permit air flow therethrough to control the total air flow to its respective intake port opening, each primary runner having a cross-sectional area that is approximately 40% to 50% of the total cross-sectional area of the intake port opening associated therewith to assure a minimum restriction to flow assuring sufficient flow volume of air into the cylinder to define a wide operating range of the engine during flow through only the primary runner while concurrently providing sufficient swirl velocity to the air to stabilize combustion and enhance burn rates of an air/fuel charge inducted into the cylinder through the opening, and wherein the two runners are defined by a common partition wall extending longitudinally towards the stem and laterally, from the floor of the intake air passage, upwardly in the same direction as the stem to provide two side-by-side longitudinally extending runners split by the wall.

2. A system as in claim 1, the wall extending longitudinally to and immediately adjacent the stem to positively split the air flow into the opening into two paths to control swirl air motion upon the variable opening and closing of the deactivation valve.

3. A system as in claim 1, the dividing wall extending longitudinally upstream to at least the location of the deactivation valve to define a predetermined volume in the secondary runner between the port opening and the deactivation valve.

4. A system as in claim 3, wherein the predetermined volume is less than 15% of the cylinder displaced volume so as not to diminish the effect of the induction velocity of the air through the primary runner when the deactivation valve is closed.

5. An induction system for a multi-cylinder internal combustion engine having at least one intake valve port opening per cylinder, an intake valve reciprocably mounted in the opening and having a stem projecting outwardly therefrom, an air inlet passage connected to the opening, the passage containing a wall which extends upwardly from the floor of the air intake passage dividing the passage into individual primary and secondary intake manifold runners with each runner connected at one end to air and both runners connected at their other ends to the cylinder intake valve port opening, the wall extending in line with and parallel to the intake valve stem locating the primary and secondary runners side-by-side, one end of the wall extending to a point essentially contiguous to the stem to positively separate the runners, the primary runner being connected to the opening in a manner to effect flow tangentially thereinto to induce a strong swirl motion to an air/fuel mixture adapted to be inducted into the cylinder, and deactivation valve means variably moveable in each secondary runner to block or permit air flow therethrough to control the total air flow to the intake port opening, the primary runner having a cross-sectional area that is approximately 40% to 50% of the total cross-sectional area of the intake port opening associated therewith to assure a minimum restriction to flow assuring sufficient flow volume of air into the cylinder to define a wide operating range of the engine during flow through only the primary runner while concurrently providing sufficient swirl velocity to the air to stabilize combustion and enhance burn rates of an air/fuel charge inducted into the cylinder through the opening.

6. A system as in claims 1 or 5, wherein the longitudinal centerline of the primary runner is located outboard of the secondary runner with respect to the cylinder bore centerline for inducing a strong swirling motion to the primary flow into the cylinder.

7. A system as in claims 1 or 5, wherein that portion of the partition wall immediately adjacent the valve stem is oriented with respect to the cylinder bore centerline such that in plan view the angle formed between a line normal to the centerline of the partition wall as extended through the center of the intake valve stem and a second line extending from the cylinder bore center through the intake valve stem is between 10 and 20 degrees.

8. A system as in claims 1 or 5, wherein the longitudinal centerline of the end of the primary runner immediately adjacent the intake valve extended past the intake valve intersects a line extending from the cylinder bore center through the center of the intake valve stem out to the cylinder bore, the distance of the intersection from the cylinder bore center being between 0.75 and 0.85 of the cylinder bore radius.

9. A system as in claims 1 or 5 including a spark plug located between the cylinder bore and the intake valve in a location such that the incoming swirling air charge scavenges the electrodes of exhaust gas residuals to effect optimum initiation of subsequent combustion.

10. A system as in claim 1, wherein the air inlet is located upstream of the partition wall splitting the air into primary and secondary air flow paths, the primary runner having essentially a constant cross-sectional shape to minimize flow losses resulting from splitting the flow into the two paths.

11. A system as in claim 5, the dividing wall extending longitudinally upstream relative to the passage to at least the location of the deactivation valve to define a predetermined volume in the secondary runner between the port opening and the deactivation valve, the predetermined volume being less than 15% of the cylinder displaced volume so as not to diminish the effect of the induction velocity of the air through the primary runner when the deactivation valve is closed.

* * * * *